United States Patent Office 3,449,439
Patented June 10, 1969

3,449,439
PROCESS FOR THE PRODUCTION OF SULFONES FROM SULFIDES AND SULFOXIDES
Ludwig Kuhnen, Ferdinand List, and Erwin Vangermain, Marl, Germany, assignors to Chemische Werke Huls Aktiengesellschaft, Marl, Germany, a corporation of Germany
No Drawing. Filed Mar. 21, 1966, Ser. No. 535,728
Claims priority, application Germany, Apr. 7, 1965, C 35,532
Int. Cl. C07c *147/06, 147/02, 147/04*
U.S. Cl. 260—607
5 Claims

ABSTRACT OF THE DISCLOSURE

A sulfone is produced from an organic sulfide, or organic sulfoxide, by reacting same with an organic hydroperoxide in the presence of an appropriate catalyst selected from compounds of titanium, molybdenum and vanadium.

---

Different oxidation processes are available for the production of oxygen containing organic compounds. In the choice of the oxidizing agent one may consider not only the primary economic considerations but also, among others, the kind and amount of undesired byproducts which will be produced from the materials to be oxidized or from the oxidizing agent or both. For most purposes inorganic oxidizing agents and frequently also oxygen are excluded. Hydrogen peroxide generally works well but is not the most economical. The same is true of organic peracids which have the additional disadvantage that they cannot be used in acid systems.

There is therefore a need for a process that will permit the use of an economically producible oxidizing agent for the conversion of sulfide or sulfoxide into a high yield of sulfone.

An object of a process which does not belong to the state of the art is the making of organic hydroperoxide by the catalystic oxidation of appropriate hydrocarbons with air to yields of 90% or more. Now it appears that these organic hydroperoxides are attractive oxidizing agents which are adopted for use in oxidation processes for which less useful agents have been used heretofore. It appeared useless to apply hydroperoxides for the production of sulfones from sulfides and sulfoxides.

According to Batemen (Proc. Roy. Sec., (London), A 224, 339 and 389 (1954) and Barnard (J. Chem. Soc. (1956), 489), when a sulfide is reacted with an organic hydroperoxide in the obvious way without the use of any special precautions only the corresponding sulfoxide is produced.

Now, surprisingly, it has been found that sulfone is produced at a high conversion and in a surprisingly high yield and purity when a sulfide or sulfoxide is reacted with an organic hydroperoxide in the presence of a compound of a metal of groups IV-B, V-B and VI-B of the periodic system of Mendeleev and mixtures thereof.

Suitable sulfides and sulfoxides for use in the process are the aliphatic as well as the aromatic and mixed compounds for example dimethylsulfoxide, thiodiglycol and thioanisole. Polythioethers also may be used.

Suitable catalyst are compounds of the metals of Groups IV-B, V-B and VI-B of the periodic system of Mendeleev and mixtures thereof and especially the compounds of vanadium, molybdenum and tungsten. Suitable compounds of these metals are the oxides such as $V_2O_5$, $Mo_2O_3$, $MoO_3$ and $WO_3$ and the corresponding acids, salts of inorganic acids such as sodium vanadate, vanadium sulfate and vanadium trichloride, salts of organic acids such as vanadium naphthenate, esters of inorganic acids such as titanium tetraisobutylate and organic complex compounds such as acetylacetonates e.g. vanadium acetylacetonate, molybdenum acetylacetonate and zirconium acetylacetonate.

As the oxidizing agent the organic hydroperoxides of primary, secondary and tertiary compounds may be used. The secondary hydroperoxides such as cyclohexenyl hydroperoxide and especially the tertiary organic hydroperoxides which contain only carbon, hydrogen and oxygen as well as their halogen analogs which contain one or more atoms of chlorine or bromine are preferred. Examples of these compounds are ethylbenzenehydroperoxide tert.-butylhydroperoxide, cumuolhydroperoxide, chloro-tert.-butylhydroperoxide and p-chloro-cumolhydroperoxide.

The catalysts are used within a very wide range, suitably within the range from 0.01 to 10% by weight based upon the weight of the organic hydroperoxide and preferably within the range from 0.1 to 3%. The reaction can take place in a homogeneous or heterogeneous phase and the catalyst can be in solution, suspension or on a carrier material. The soluble catalysts have been found to be especially effective.

The reaction may be carried out in the presence of a solvent. Suitable solvents are those which do not react with the organic hydroperoxide under the reaction conditions such as benzene, alcohols and esters. On occasion an aqueous two-phase system such as benzene and water has proven to be suitable.

Such solvents as those mentioned above do not materially affect the yield. Also the presence of acid or base is not detrimental to the reaction.

It is advantageous for the success of the process that the reactants are not brought together too suddenly. It has proven to be more advantageous to add one reagent which preferably contains the catalyst and if desired in the presence of a solvent, slowly and in small amounts to the other reactant which also may contain catalyst. Preferably one of the reactants is introduced into the reaction chamber first and the second reactant is then added slowly dropwise or in a small stream. Also by mixing the well cooled reactants and then by gradually raising the temperature of the mixture and, if desired, with simultaneous dosing of catalyst one may effect a smooth course of the reaction.

The time required for the reaction depends upon the reaction conditions, especially the reaction temperature, the kind and amount of catalyst, the properties of the organic hydroperoxide and of the compound to be oxidized and the end concentration of the hydroperoxide in the reaction mixture. The reaction time may vary from 0.5 hour to 2 days and generally is from 1 to 10 hours. By providing for a good, strong stirring so that no harmful concentrations occur in the reaction vessel which might result in violent and uncontrollable reaction and by providing also for a efficient removal of the reaction heat it is possible to carry out a relatively rapid reaction.

The hydroperoxide may be introduced into the reaction vessel and the sulfide or sulfoxide containing the catalyst may be gradually added or the hydroperoxide containing the catalyst may be introduced into the reaction vessel and the sulfide or sulfoxide gradually added. It is preferred however to introduce the sulfide or sulfoxide mixed with the catalyst into the reaction vessel and to slowly add the organic hydroperoxide at the desired temperature.

The gradual addition of the reagent is always effected in such a way that no high concentration thereof in the mixture may occur. Preferably a concentration of hydroperoxide in the mixture greater than 30-40% and especially greater than 50% is avoided.

It has been found that a careful temperature control contributes to the success of the reaction. The process should be carried out at a temperature within the range from −20 to 180° C. and preferably within the range from 40 to 120° C. and especially about 70° C. It is also advisable to provide for good mixing of the reactants in order to provide for good heat transfer and to avoid local overheating. One may also provide for internal cooling by choice of the solvent and operation under reflux.

It has been found also to be highly advantageous to carry out the process in such a way that the reaction is terminated before the organic peroxide is completely used up. The reaction preferably is interrupted when less than 1% of hydroperoxide is still present in the reaction mixture.

The working up of the reaction product mixture depends upon the physical and chemical properties of the oxidation product. Frequently it may be separated from the reaction mixture by fractional distillation under reduced pressure and/or by crystallization. In this way the desired product may be recovered in practically pure form. Obviously however other methods may be employed such as precipitation, extraction, etc.

The process of the invention permits sulfides and sulfoxides to be oxidized almost quantatively. The reaction generally goes quickly under mild conditions and with practically no side reactions. It is noteworthy that by the process of the invention oxidations are possible which give insufficient results with per acids. The process is of quite general utility and can be carried out equally well under basic, neutral or acid conditions. No special expense is involved in carrying out the process. A valuable aspect of the process is that the organic hydroperoxides used are completely reduced to alcohols that can be recovered.

EXAMPLE 1

124 g. of thioanisol and 1 g. of vanadium pentoxide were deposited in a 1 liter reaction vessel equipped with a stirrer and a dropping funnel and heated to 80° C. 420 g. of cumene hydroperoxide (72.5%) was then added dropwise to the suspension in the reaction vessel over a period of 3 hours at 80–85° C. The resulting mixture was then stirred for 3 hours at 80–85° C. at which point it contained 0.5% of peroxide. The warm mixture was then filtered and the filtrate was distilled in vacuum. After distillation through the range from 25 to 145° at 25 torr. a liquid residue remained. This residue crystallized upon standing and was recrystallized from methanol or acetyl acetate giving 120 g. of phenylmethylsulfone having a melting point of 82–86° C. (uncorrected). The yield was 77%.

EXAMPLE 2

78 g. of dimethylsulfoxide and 0.7 g. of vanadium pentoxide were deposited in a 1 liter reaction vessel equipped with a stirrer and dropping funnel. To the resulting suspension 210 g. of cumene hydroperoxide (72.5%) was added dropwise over a period of 1 hour. The temperature tended to rise rapidly and was held at 80–85° C. by cooling. The resulting mixture was stirred for 3 hours at 80° C. The resulting hot mixture was diluted with benzene and filtered. The working up of the filtrate gave 85 g. of dimethylsulfone which melted at 105–108° C. (uncorrected). The yield was 90.5%.

EXAMPLE 3

124 g. (1 mol) of thioanisol and 0.5 g. of molybdenum (111) acetylacetonate in benzene were deposited in a 1 liter, three necked flask equipped with a stirrer, a reflux cooler and a dropping funnel and heated to 50–55° C. 240 g. of 75% tert.-butylhydroperoxide 2 (mol) was introduced into the solution in the flask dropwise over a period of 1.5 hours. The resulting solution was stirred for 8 hours at 60–65° C. at which point it still contained 0.2% of peroxide. The benzene and tert. butanol contents of the reaction mixture were distilled out under vacuum whereupon the residue promptly crystallized. The crystal product was washed with petroleum ether and dried and amounted to 153 g. of phenylmethylsulfone having a melting point of 79–84° C. (uncorrected). The yield was 98% of the theoretical yield.

EXAMPLE 4

65 g. (0.5 mol) of n-butyl-allyl-sulfide and 0.5 g. of molybdenum-(111)-acetyl acetonate in 100 ml. of benzene were deposited in a 1 liter, three necked flask equipped with a stirrer, reflux cooler and dropping funnel. 60 g. of 75% tert.butylhydroperoxide, 0.5 mol) was introduced dropwise into the solution in the flask at 30–32° C. in the course of 1 hour. The resulting solution was stirred for 3 hours at 30–32° C. Then a further 60 g. of 75% tert.butyl-hydroperoxide was introduced dropwise at the same temperature and the mixture was stirred for 3 hours at 30–32° C. and then for 8 hours at 60° C. At this point the solution did not contain any peroxide. The benzene and tert.butanol were distilled out and the residue was fractionated under vacuum. The yield was 68 g. of n-butyl-allyl-sulfone having a boiling point of 85–90° C. at 0.1 torr. The yield was 84% of the theoretical yield.

We claim:

1. Process for the production of an organic sulfone which comprises reacting an organic hydroperoxide selected from the group consisting of chloro-tert-butylhydroperoxide, cyclohexenyl-hydroperoxide, tert. - butylhydroperoxide, ethylbenzene-hydroperoxide and cumolhydroperoxide, with a member selected from the group consisting of thioanisol, dimethylsulfoxide, n-butyl-allylsulfide and thiodiglycol in the presence of a catalyst selected from the group consisting of compounds of titanium, molybdenum and vanadium, the reaction being carried out at a temperature within the range −20° to 180° C.

2. Process as defined in claim 1 in which the reaction is carried out at a temperature within the range from 40 to 120° C.

3. Process as defined in claim 1 in which the reactants are gradually mixed.

4. Process as defined in claim 1 in which the reaction is interrupted as soon as the content of hydroperoxide in the reaction mixture falls below 1%.

5. Process as defined in claim 1 in which the reaction is carried out in the presence of a solvent.

References Cited

UNITED STATES PATENTS 3,138,519   6/1964   Riden et al.

FOREIGN PATENTS 3,924,444   3/1962   Japan.

OTHER REFERENCES

Schultz et al.: "J. Org. Chem." 28, pp. 1140–1142 (1963).

CHARLES B. PARKER, *Primary Examiner.*

D. R. PHILLIPS, *Assistant Examiner.*